United States Patent
Kirschner

(10) Patent No.: US 12,027,806 B2
(45) Date of Patent: Jul. 2, 2024

(54) PREDICTIVE BRUSH CONTROL FOR SEPARATELY EXCITED ELECTRIC MOTORS

(71) Applicant: AUDI AG, Ingolstadt (DE)

(72) Inventor: Sebastian Kirschner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 351 days.

(21) Appl. No.: 17/551,416

(22) Filed: Dec. 15, 2021

(65) Prior Publication Data
US 2022/0311198 A1    Sep. 29, 2022

(30) Foreign Application Priority Data
Mar. 25, 2021   (DE) .......................... 102021107460.6

(51) Int. Cl.
*H01R 39/58*       (2006.01)
*H02K 41/02*       (2006.01)
*H02P 5/46*        (2006.01)

(52) U.S. Cl.
CPC ............. *H01R 39/58* (2013.01); *H02K 41/02* (2013.01); *H02P 5/46* (2013.01)

(58) Field of Classification Search
CPC ........ H01R 39/58; H01R 39/40; H01R 39/59; H01R 39/42; H01R 39/44; H02K 41/02; H02K 23/18; H02K 13/00; H02K 11/30; H02K 13/006; H02P 5/46; H02P 25/022
See application file for complete search history.

(56) References Cited

U.S. PATENT DOCUMENTS

| | | | |
|---|---|---|---|
| 2008/0131099 A1 | 6/2008 | Furman | |
| 2016/0118867 A1* | 4/2016 | Iwata | H02K 11/25 310/68 B |
| 2017/0085198 A1* | 3/2017 | Scholz | H02P 29/50 |

FOREIGN PATENT DOCUMENTS

| | | |
|---|---|---|
| DE | 19619728 B4 | 6/2006 |
| DE | 102012214122 A1 | 2/2014 |
| GB | 2059686 A | 4/1981 |
| WO | 2010093617 A2 | 8/2010 |

OTHER PUBLICATIONS

German Search Report issued on Oct. 22, 2021 in corresponding German Application No. 102021107460.6; 10 pages; Machine translation attached.

* cited by examiner

*Primary Examiner* — Thomas Truong
(74) *Attorney, Agent, or Firm* — Maier & Maier, PLLC

(57) ABSTRACT

A device and a method for predictive brush control in separately excited electric motors.

19 Claims, 1 Drawing Sheet

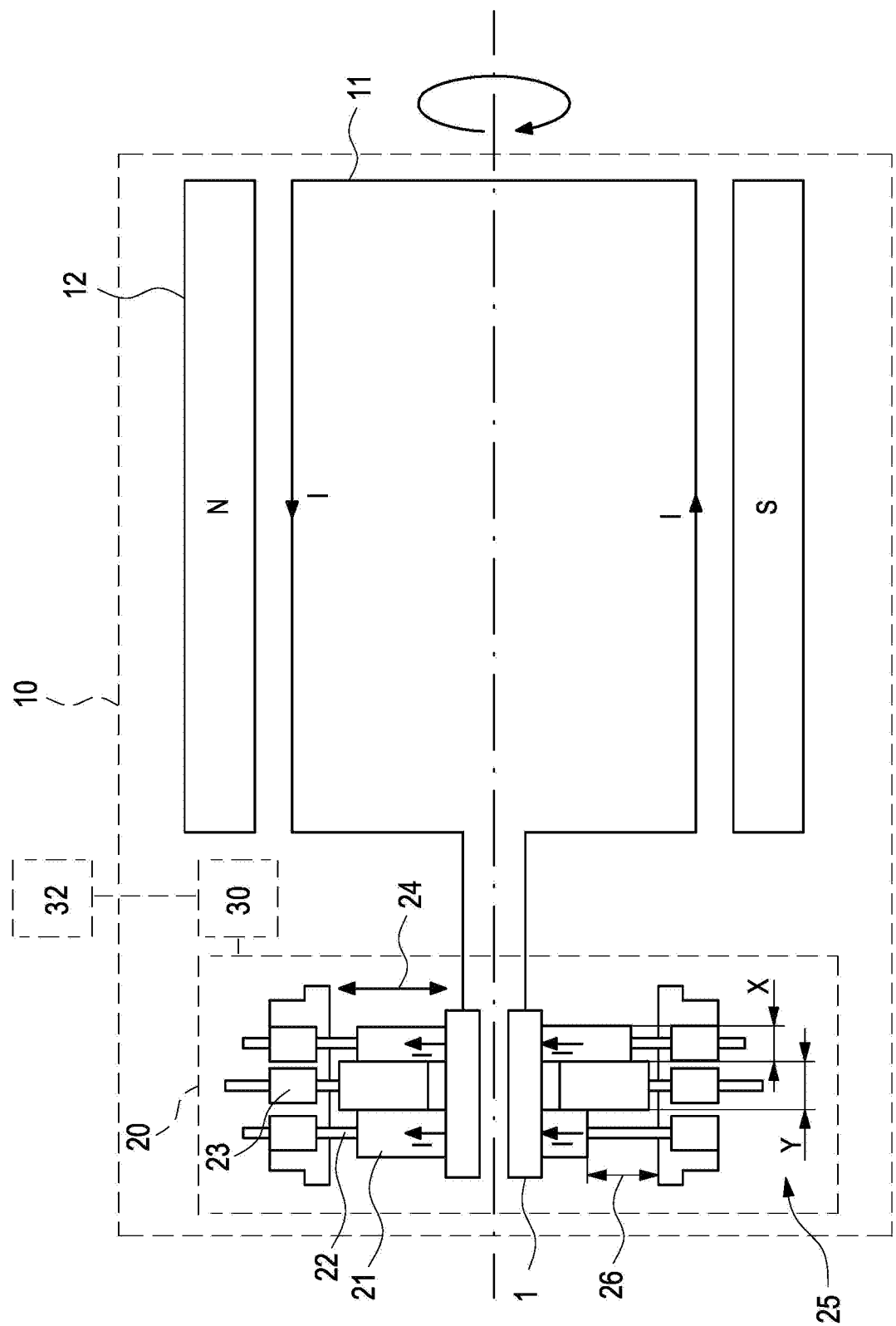

PREDICTIVE BRUSH CONTROL FOR SEPARATELY EXCITED ELECTRIC MOTORS

FIELD

The invention relates to a device and a method for predictive brush control in separately excited electric motors.

BACKGROUND

In the case of separately excited electric motors, the excitation current is transmitted via brushes to the commutators or slip rings, which are located on the rotor (armature). The brush is pressed against the commutator by a pressure spring. This creates a conductive connection between the two subcomponents, such that a current can flow into the rotor, which is thereby stimulated to rotate. The function of the sliding contact through the brushes is identical in DC and AC motors, except that AC motors do not require a commutator because the excitation power is transmitted to the rotor via a slip ring.

The pressure spring continuously presses the brush onto the commutator or slip ring. As a result, friction losses also occur when the electrical machine is not working in either motor or generator mode. In the case of electric traction drives in the vehicle, such operating points exist when the vehicle is sailing, for example, i.e. is in freewheeling mode. The sliding contact (transition from brush to commutator/slip ring) causes permanent losses. In addition, many operating points do not require the entire contact surface from brush to commutator or slip ring, since the maximum power does not always have to be transmitted (e.g. when driving continuously in the partial load range). In addition, the sliding contact always generates a noise due to the sliding movement. Depending on the design, the components used, and the required power, these noise emissions can be perceived as annoying (inside and outside the vehicle). Continuous contact with the brushes also leads to constant abrasion and thus to internal contamination of the motor, which in turn can have a negative impact on the functionality and effectiveness of the electrical machine over time.

US 2008/131099 A1 discloses a method, a computer-readable medium, and a system for automatically determining a proper operating current for an electric motor. In the method, a test signal is sent to an input of the electric motor and a reaction to the test signal is measured at an output of the electric motor. Based on the measured reaction, a position of a brush is determined, which can conduct current through a commutator of the electric motor. The electric motor is supplied with a first input current when the brush is in a first position and a second input current when the brush is in a second position.

GB 2 059 686 A relates to brushes for electrical machines, wherein the brushes are of the split type, i.e. comprising a number of unbonded conductive layers. Conductive layers of a split brush are spaced apart from one another by an insulating layer.

A brush holder arrangement for a dynamoelectric machine is known from WO 2010/093 617 A2. It comprises a brush holder which is snap-fastened to a shielding device. A brush element is movably mounted in the brush device and includes a recessed area and a shunt element. A constant force spring is operatively connected between the second end portion of the brush and the brush mount.

SUMMARY

Against this background, it is the object of the invention to provide devices and methods with which the efficiency of an electric motor of a vehicle drive can be improved and the wear and tear on the electric motor can be reduced.

The invention relates to a separately excited electric motor which comprises a brush unit with partial brushes, each of which can be moved to a commutator via an adjusting mechanism driven by an adjusting motor in order to reversibly establish electrical contact between partial brush and commutator, or from the commutator can be moved away in order to reversibly interrupt electrical contact between the partial brush and the commutator. According to the invention, the brush unit comprises the partial brushes and the associated adjusting mechanisms and adjusting motors. According to the invention, the brush unit is connected to a control unit which is set up to control the adjusting motors in such a way that only a minimum contact surface is provided between the entirety of the partial brushes and the commutator to reach a predicted, imminent operating point of the electric motor. In one embodiment, the control unit is integrated in the electric motor. In another embodiment, the control unit is located outside the electric motor.

The separately excited electric motor is designed in such a way that, instead of one large brush, there are several smaller partial brushes with a reduced width for each contact. Each of these partial brushes can be actively adjusted individually via an adjusting motor and thus removed from the commutator/wiper or pressed against it. If the brushes are removed from the commutator/wiper, such that an air gap is created between the subcomponents, no more current can flow. Using predictive data on an imminent operating point, the partial brushes are accordingly applied or removed in a variable manner in advance, so that only the minimum required contact surface between the entirety of the partial brushes and the commutator/wiper is provided. The aim is to have the ideal brush configuration on the commutator or wiper at the time of power output or consumption.

In freewheeling mode, i.e. when no current has to flow, all brushes can also be raised in order to achieve maximum efficiency at this operating point without friction losses. As soon as more power has to be transferred to the electric motor, the control unit controls the individual adjusting motor in such a way that a feed is generated that brings the partial brush(es) into contact with the commutator or slip ring. The required brush contact area is calculated over the entire journey.

The brush unit comprises two sets of partial brushes, one set per contact. The brush unit comprises several partial brushes per contact, for example two, three or four partial brushes. In one embodiment, the brush unit comprises partial brushes of different widths. In one embodiment, all partial brushes of a set have different widths. In a special embodiment, the widths of the partial brushes are staggered, for example at a ratio of 1:2:3: . . . n, or 1:2:4: . . . 2n, or 1:3:9: . . . 3, or 1:4:8: . . . 2" Due to the different widths of the partial brushes, the total brush surface resting on the commutator/wiper can be adjusted more flexibly.

In one embodiment, the brush unit comprises means for detecting a length of the partial brushes. In another embodiment, the means for detecting a length of the partial brushes are set up to transmit the length of the partial brushes to the control unit. The control unit can use this data to control the partial brushes so that it is ensured that contact with the commutator/slip ring is reliably established even if partial brushes are shortened due to wear. The length of the partial brushes can also be used to identify when they need to be replaced.

As a rule, electric motors are used as adjusting motors. In one embodiment, the adjusting motors are linear motors.

In one embodiment, the control unit is connected to a computing unit set up to predict an imminent operating point of the separately excited electric motor. In another embodiment, the computing unit is set up to receive and process real-time information with regard to the vehicle surroundings, route, traffic data.

The invention also relates to a method for operating a separately excited electric motor of a vehicle drive according to the invention, in which the control unit controls the adjusting motors of the brush unit, such that only a minimum contact surface between the entirety of the partial brushes and the commutator is provided that is required to achieve the predicted imminent operating point of the electric motor.

In one embodiment of the method, the lengths of the individual partial brushes of the brush unit are determined and taken into account when controlling the associated adjusting motors.

In one embodiment of the method, the imminent operating point of the electric motor is predicted by a computing unit on the basis of real-time information with respect to the vehicle surroundings, route, traffic data, and data on the current driving behavior of the driver of the vehicle.

A computing unit uses the current driving behavior, the route, the traffic data and data from communication with other vehicles and the traffic infrastructure to calculate which output is likely to be requested next by the separately excited electric motor.

In one embodiment, the vehicle has access to various real-time information relating to the vehicle's surroundings, route, traffic data online, and data obtained through the exchange with other road users (Car2Car) and other objects (Car2X). This data is evaluated with the help of a central processing unit (ECU: electronic control unit) in the vehicle or by a data processing unit (server) located on the Internet. Using this and other information (e.g. current driving behavior of the driver), it is possible to predict which output will be required in the following driving situations. The computing unit determines how much brush contact area is required in the respective immediately subsequent operating point, and the control unit controls the individual partial brushes of the brush unit as a function thereof.

In one embodiment of the method, using a self-learning algorithm in the ECU or the server, increasingly more accurate predictions can be made as to how the driver's driving behavior will be and how this, in combination with the predictive data, affects the power output and consumption of the vehicle or the electric motors, respectively. In this way, the brush contact area can be selected more and more precisely and with a more accurate fit.

One of the advantages of the solution according to the invention is that, since all partial brushes can be controlled predictively and moved vertically, the most energetically sensible wiring of the brush contact area can be selected individually and depending on the upcoming power output and consumption. This actively contributes to improving the efficiency of the drive. In addition, the computing unit in the vehicle can determine exactly if and when a (partial) brush needs to be replaced. In addition, the method can contribute to greatly reducing or completely avoiding noise emissions, which often have a disruptive effect, especially in the vehicle. Another positive effect is that the brush material is preserved, since abrasion is reduced. The shelf life can be extended and costly repairs be avoided. At the same time, unnecessary contamination of the drive and an associated deterioration in efficiency are avoided. Reduction of heat development on the sliding surface and thus containment of the thermal warming of the entire motor means that it does not have to be cooled so much and that the vehicle can be moved for a longer period without having to accept a reduction in output (due to an excessively high temperature). The predictive brush application management also avoids any acceleration delay that results when the brushes are only applied at the direct point in time of the load request, for example when the driver presses the accelerator pedal. Further advantages and embodiments of the invention will be apparent from the description and the accompanying drawing.

It is apparent that the above-mentioned features and the features still to be explained hereinafter are usable not only in the particular specified combination but rather also in other combinations or alone, without leaving the scope of the present invention.

BRIEF DESCRIPTION OF THE FIGURE(S)

The invention is schematically illustrated in the drawing with the aid of embodiments and is described further with reference to the drawing. Wherein:

The single FIGURE shows a schematic representation of an embodiment of the brush unit according to the invention.

DETAILED DESCRIPTION

The FIGURE shows a separately excited electric motor 10 with an embodiment of the brush unit 20 according to the invention. The separately excited electric motor 10 has a rotor 11 and a stator 12 in which the rotor 11 rotates when a current I flows through it. The rotor 11 is supplied with current via a commutator 13. The current I is fed to the commutator 13 via the brush unit 20.

The brush unit 20 comprises several (partial) brushes 21 (1 . . . n), which are each moved individually via an adjusting mechanism 22 and an adjusting motor 23 to the commutator 13 and can brought into electrically conductive contact with the commutator 13 or can be moved away therefrom, whereby the electrical contact is interrupted between the (partial) brush 21 and the commutator, and an air gap is formed. The (partial) brushes 21 have a vertical variability 24, which is indicated in the drawing by the arrow, i.e., they can each be moved up to a maximum distance from the surface of the commutator 13 and on the other hand in the direction of the surface of the commutator 13 are tracked in order to compensate for wear of the (partial) brush 21 due to abrasion. The individual (partial) brushes 21 are electrically isolated from one another. In the embodiment shown in the drawing, the (partial) brushes 21 have different brush widths (x, y) 25. The brush unit 20 has means 26 for detecting the length of the (partial) brushes 21. The measurement of the length of the (partial) brushes 21 enables, on the one hand, an exact setting of the position of the (partial) brushes 21, even if the length of the (partial) brushes 21 changes due to wear, and, on the other hand, it also enables the point in time at which replacement of a (partial) brush 21 is required.

A control unit 30 controls the adjusting motors 23 of the individual (partial) brushes 21 to set the current flow through the commutator 13 required for the respective immediately following operating point. The control unit 30 (or a central processing unit 32 connected thereto) determines how much brush contact area is minimally required at the respective operating point and controls the individual (partial) brushes 21 accordingly.

In freewheeling mode, i.e., when no current has to flow, all (partial) brushes 21 can also be raised in order to achieve maximum efficiency at this operating point without friction losses. As soon as more output is requested again, the individual adjusting motors 23 are activated in such a way that a respective feed is generated, as a result of which the respective (partial) brushes 21 contact the commutator 13. The required brush contact area is calculated over the entire journey.

LIST OF REFERENCE NUMERALS

- 10 separately excited electric motor
- 11 rotor
- 12 stator
- 13 commutator
- 20 brush unit
- 21 brushes
- 22 adjusting mechanism
- 23 adjusting motors
- 24 vertical variability
- 25 different brush widths
- 26 detection of the brush length
- 30 control unit
- 32 computing unit

The invention claimed is:

1. A separately excited electric motor, comprising: a brush unit with partial brushes, each of which is configured to move towards a commutator via an adjusting mechanism driven by an adjusting motor to reversibly establish an electrical contact between partial brush and commutator, or to move away from the commutator to reversibly interrupt an electrical contact between partial brush and commutator, wherein the brush unit is connected to a control unit which is set up to control the adjusting motors in such a way that only a minimum contact surface between the entirety of the partial brushes and the commutator is provided that is required to reach a predicted, imminent operating point of the electric motor.

2. The separately excited electric motor according to claim 1, wherein the partial brushes have different widths.

3. The separately excited electric motor according to claim 2, further comprising means for detecting a length of the partial brushes.

4. The separately excited electric motor according to claim 2, wherein the adjusting motors are linear motors.

5. The separately excited electric motor according to claim 2, wherein the control unit is connected to a computing unit set up to predict an imminent operating point of the separately excited electric motor.

6. The separately excited electric motor according to claim 1, which comprises further comprising means for detecting a length of the partial brushes.

7. The separately excited electric motor according to claim 6, wherein the adjusting motors are linear motors.

8. The separately excited electric motor according to claim 6, wherein the control unit is connected to a computing unit set up to predict an imminent operating point of the separately excited electric motor.

9. The separately excited electric motor according to claim 6, wherein the means for detecting a length of the partial brushes are set up to transmit the length of the partial brushes to the control unit.

10. The separately excited electric motor according to claim 9, wherein the adjusting motors are linear motors.

11. The separately excited electric motor according to claim 9, wherein the control unit is connected to a computing unit set up to predict an imminent operating point of the separately excited electric motor.

12. The separately excited electric motor according to claim 1, wherein the adjusting motors are linear motors.

13. The separately excited electric motor according to claim 1, wherein the control unit is connected to a computing unit set up to predict an imminent operating point of the separately excited electric motor.

14. The separately excited electric motor according to claim 13, wherein the computing unit is set up to receive and process real-time information with respect to vehicle surroundings, route, and traffic data.

15. The separately excited electric motor according to claim 1, wherein the control unit is connected to a computing unit set up to predict an imminent operating point of the separately excited electric motor.

16. A method for operating a separately excited electric motor of a vehicle drive according to claim 1, wherein the control unit controls the adjusting motors of the brush unit, such that only the minimum contact surface between the entirety of the partial brushes and the commutator is provided that is required to achieve the predicted, imminent operating point of the electric motor.

17. The method according to claim 16, wherein lengths of the individual partial brushes are determined and taken into account in the control of the associated adjusting motors.

18. The method according to claim 17, wherein the imminent operating point of the electric motor is predicted by a computing unit on the basis of real-time information with respect to vehicle surroundings, route, traffic data, and data on current driving behavior of the driver of the vehicle.

19. The method according to claim 16, wherein the imminent operating point of the electric motor is predicted by a computing unit on the basis of real-time information with respect to vehicle surroundings, route, traffic data, and data on current driving behavior of the driver of the vehicle.

\* \* \* \* \*